(12) United States Patent
Varadarajan et al.

(10) Patent No.: US 10,115,148 B1
(45) Date of Patent: Oct. 30, 2018

(54) SELECTION OF TOOLS

(71) Applicant: Amazon Technologies, Inc., Reno, NV (US)

(72) Inventors: Anand Varadarajan, Bellevue, WA (US); Gregory Scott Miller, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1197 days.

(21) Appl. No.: 14/168,767

(22) Filed: Jan. 30, 2014

(51) Int. Cl.
*G06Q 30/00* (2012.01)
*G06Q 30/06* (2012.01)

(52) U.S. Cl.
CPC ..... *G06Q 30/0641* (2013.01); *G06Q 30/0631* (2013.01)

(58) Field of Classification Search
CPC .................................................. G06Q 30/0631
USPC .............................................. 705/26.1–27.2
See application file for complete search history.

(56) References Cited

U.S. PATENT DOCUMENTS

| 2003/0040976 A1* | 2/2003 | Adler | G06Q 30/02 705/27.1 |
| 2009/0055334 A1* | 2/2009 | Song | H04L 67/22 706/17 |

* cited by examiner

*Primary Examiner* — William J Allen
*Assistant Examiner* — Anand R Loharikar
(74) *Attorney, Agent, or Firm* — Kilpatrick Townsend & Stockton LLP

(57) ABSTRACT

A tools management module of an electronic marketplace may be provided to analyze tool use information for previous and existing users of the electronic marketplace. In some examples, the user information may characterize the action of the previous and existing users with respect to one or more tools. Based at least in part on the analyzed information, the tools management module may be configured to predict relevant tools for new users of the electronic marketplace and to also predict relevant users for new tools of the electronic marketplace.

22 Claims, 10 Drawing Sheets

SELECTION OF TOOLS

BACKGROUND

As purchasing and selling goods in electronic marketplaces has become more sophisticated, a large number of tools have been developed. These tools may be utilized by users associated with the electronic marketplaces for managing goods with respect to the electronic marketplaces. In some electronic environments, the sheer number of tools may pose challenges to users. In addition, although a wide variety of tools may be available for use, certain users may only choose to use a subset of the tools. Other users, with different characteristics, may choose to use a different subset of the tools. In either case, and in other cases, deciding which tools to use may pose challenges to users associated with the electronic marketplaces.

BRIEF DESCRIPTION OF THE DRAWINGS

Various embodiments in accordance with the present disclosure will be described with reference to the drawings, in which.

DETAILED DESCRIPTION

Figure 1:
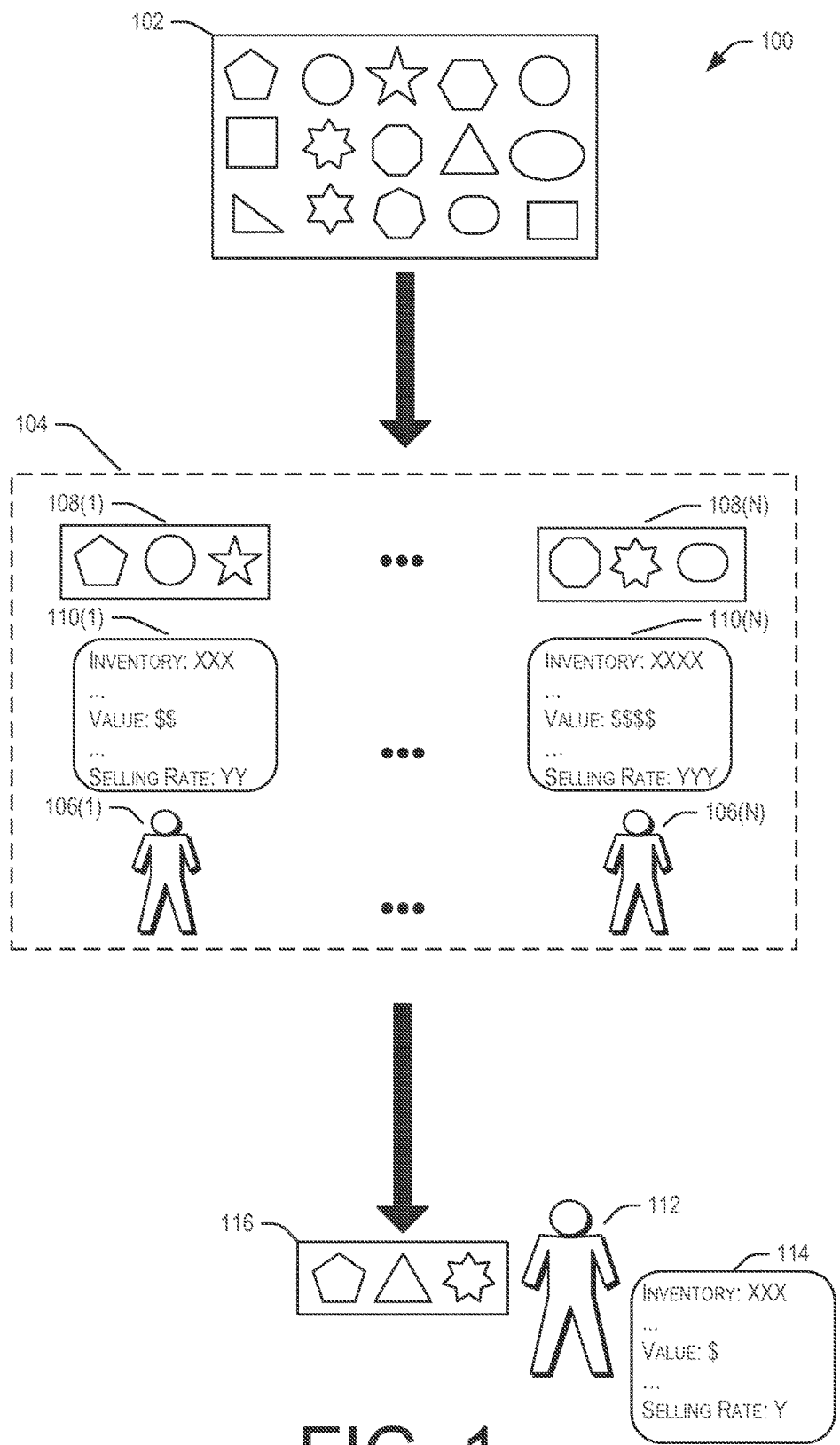
FIG. 1 illustrates an example environment for implementing tool selection techniques as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, recommending tools to users associated with an electronic marketplace. While the disclosure describes recommending tools to users (e.g., sellers, merchants, item providers, etc.) associated with an electronic marketplace, the techniques described herein are also applicable to other environments where users are presented with tools for providing and/or offering items. A "tool" as used herein, and described more fully below, includes any suitable software (e.g., module, component, code, etc.), device, or implement, associated with an electronic environment, used to carry out a particular function. In some examples, functions of tools may include producing reports, processing data, managing inventory, and the like.

In some examples, tools may be recommended to users based on relevance and/or suitability. The relevancy or suitability of the tools to a particular user may be determined based on how similar users utilize, or have utilized, the sets of tools, in addition to characteristics of the particular user. Similarity of users may be a function of, for example, type of goods sold, type of user, inventory characteristics, user characteristics, use of one or more services associated with the electronic marketplace, and the like.

In one example of the present disclosure, a user desires to sell goods in connection with an electronic marketplace. The user subscribes to a service associated with the electronic marketplace to aid in managing the sale of the goods. As part of the subscription, the user is given access to numerous tools; however, in reality the user is only interested in using a subset of the tools that are most relevant. This is likely because the numerous tools have been designed for a wide variety of users (e.g., professional sellers vs. personal sellers, those having large inventory vs. those having small inventory, etc.), and the user in this example is a personal seller with a small inventory. To assist the user, a system associated with the electronic marketplace determines which tools out of the numerous tools would be most relevant to the seller. To do so, the system begins by analyzing how other similar users have utilized the numerous tools. Next, the system analyzes the characteristics of the other similar users (e.g., seller type, inventory characteristics, services subscribed to, etc.). Based on these analyses, the system predicts which tools would be most relevant to the user (i.e., which tools would the user be most interested in using). The system then presents the relevant tools to the user and enables the user to utilize the tools in connection with the electronic marketplace. The prediction of tools may also depend on a categorization of the tool and a categorization of the user by the system.

Turning now to the figures, FIG. 1 illustrates an environment 100 for implementing tool selection techniques, according to at least one example. The environment 100 may include tool repository 102. The tool repository 102 may include all tools available to all users associated with an electronic marketplace. In accordance with at least one embodiment, the tool repository 102 may be divided to only include certain tools for which particular users may have access. In some examples, the access to certain tools or subsets of tools may be given to the users in connection with a subscription or contract. For example, a user may subscribe to a service associated with the electronic marketplace and be given access to certain tools. Thus, under the terms of the subscription the user may be entitled to use tools offered through the service. The service, on the other hand, may agree to promote the user's items to potential customers by hosting them on a webpage associated with the electronic marketplace, include them in search results, and do other things to help the user sell its goods. The tools in the tool repository 102 may include, for example, inventory management tools (e.g., uploading inventory, accounting for inventory, shipping inventory, etc.), business analytics tools (e.g., rates of sales, cash flows, accounting, taxes, etc.), and other tools helpful in managing the sale of its goods.

In the illustration shown in FIG. 1, the tool repository 102 is depicted to include a plurality of tools, represented by different shapes. In the environment 100, a different shape may represent a different tool. For example, a pentagon may represent a tool for inputting inventory into a network associated with the electronic marketplace, a seven-pointed star may represent a report tool capable of producing a financial report, and so forth. While a particular number of shapes is shown, it will be apparent to one of ordinary skill in the art that more or less shapes, representing more or less tools could be included in the tool repository 102. Also, in environment 100, two arrows are illustrated. The first is located between the tool repository 102 and user space 104. This arrow indicates that tools from the tool repository 102 may be used by one or more historical users 106(1)-106(N) in connection with the electronic marketplace. The second arrow is located between the user space 104 and a new user toolbox 116. This arrow indicates that information associated with the user space 104 and the tool repository 102 may be used to populate the new user toolbox 116. These processes will be described in more detail below.

Turning next to the user space 104, situated below the tool repository 102 is the user space 104. The user space 104 is illustrated by the dashed rectangle and represents data associated with the electronic marketplace that may utilized in accordance with the techniques disclosed herein. The user space 104 may include the one or more historical users 106(1)-106(N). The users 106(1)-106(N) are historical users because they have previously been associated, or are currently associated, with the electronic marketplace, and historical information of their interactions is available to systems associated with the electronic marketplace. The historical users 106(1)-106(N) are shown separated by " . . . " to represent that there may be any suitable number of users. Similar designations are used throughout this document to represent the presence of more than one item. The historical users 106(1)-106(N) may be referred to herein as the historical user or the historical users 106. Each of the historical users 106 may be associated with information that characterizes their interaction with one or more tools from the tool repository 102. In FIG. 1, this information is shown as tool shapes within user toolboxes 108(1)-108(N) (referred to herein as the user toolboxes 108) and may be referred to as tool-utilization information. The tools illustrated in the user toolboxes 108 correspond to the tools in the tool repository 102. As noted above, each toolbox of the user toolboxes 108 is associated with a particular historical user 106.

The historical users 106 may also have an associated user profile which includes personal, public, and/or non-public information about each user. In some examples, the user profile may have been created as a condition to using the services provided by the electronic marketplace. An example user profile may include profile information, for example, demographic information, passwords, usernames, location of a brick-and-mortar store, shipping information, etc. The historical users 106 may also have other types of information associated with them. For example, commerce information, such as for example, inventory quantities, price of goods for sale, average value of goods on hand, etc. may be associated with the historical users. Examples of commerce information that may be associated with the historical users 106 is illustrated in boxes 110(1)-110(N) (the boxes 110). The information in the boxes 110 will be explained in more detail with reference to the historical users 106.

Returning to the user toolboxes 108, a pentagon, circle, and five-pointed star may be included, for example, in the user toolbox 108(1) of the historical user 106(1). In accordance with at least one embodiment, these particular tools may be included because they are the tools that the historical user 106(1) has utilized in the past or currently utilizes in connection with the sale of its goods on the electronic marketplace. Using techniques described herein, the tool-utilization information describing which tools the historical user 106(1) utilizes or has utilized may be stored in connection with the user profile of the historical user 106(1). In some examples, the tool-utilization information may be accessible or made available to a system implementing the techniques described herein. Similarly, the user toolbox 108(N) includes tools used by the historical user 106(N). The tools in the user toolbox 108(N) are different tools than those in the user toolbox 108(1). This may be because the users associated with the respective toolboxes have different goals, different characteristics, and preferences for the type of tools that each utilizes. Such information about which tools a particular user prefers may be desirable in order to recommend tools to new and/or similar users.

The box 110(1) illustrates examples of commerce information that may also be stored in connection with the user profile of the historical user 106(1). The commerce information may also be used by systems implementing the techniques described herein to recommend, propose, and/or provide tools to new and/or similar users. The box 110(1) may include the following examples of commerce information: inventory, value, and selling rate. It should be noted that the examples listed previously are non-limiting and more or less information may be characterized as commerce information and associated with the user profiles. The boxes 110(1)-110(N) are followed by a certain number of letters or symbols. The numbers and symbols are used herein to distinguish the characteristics of the commerce information of one historical user from another. Thus, it should be appreciated that while systems may be capable of identifying similarities between the historical users 106, no two users are exactly the same.

With that background, a technique for recommending tools to new user 112 will now be described. As discussed previously, a system associated with the electronic marketplace may have access to interaction information for each user. It may have access because it has collected the information and stored it. However, in some examples, the information may be provided to the system. In any case, the interaction information may indicate characteristics, behaviors, and preferences of users and their item providing operations; especially, those relating to which tools the users utilize taken in light of the users' profile information and commerce information. In accordance with techniques described herein, the system may analyze interaction information for a group of users (e.g., the historical users 106) to determine which tools to offer to the new user 112. The group of users may include at least one user and in most cases may include many more than one user. The new user 112, similar to the historical users 106, may have user profile information and commerce information (as shown in box 114) which may also be accessible by the system implementing techniques described herein. Thus, the system may analyze the interaction information of the historical users 106 (including, for example, which tools the historical users 106 utilize (i.e., tool-interaction information), profile information, and commerce information), and in some cases, the system may also consider user information related to the new user 112, to determine a set of tools for the new user 112. The determination may depend on relevance of a particular tool or set of tools to the new user 112. It may also depend on suitability or probability of use of the particular tool by the new user 112.

In some examples, the system may determine a subset of tools of the tool repository 102 that may be suitable for use by the new user 112 based at least in part on the interaction information for the historical users 106 in the user space 104. From this subset, the system may select other tools or particular configurations of tools, to present to the new user 112. In accordance with at least one embodiment, the system may present the subset of tools to the new user 112 without first selecting tools or tool configurations from the subset. As illustrated in FIG. 1, the system may have determined that tools in the new user toolbox 116 (e.g., a pentagon, a triangle, and a six-pointed star) are most relevant to the new user 112. As such, the system has presented the tools to the new user 112 by placing them in the new user toolbox 116. It should be noted that at least some tools in the new user toolbox 116 correspond to tools in the user toolboxes 108. In some examples, this might be because the system determined that the new user 112 would be interested in the particular tool based at least in part on a comparison of the interaction information for the historical user 106 and information about the new user 112.

Figure 2:
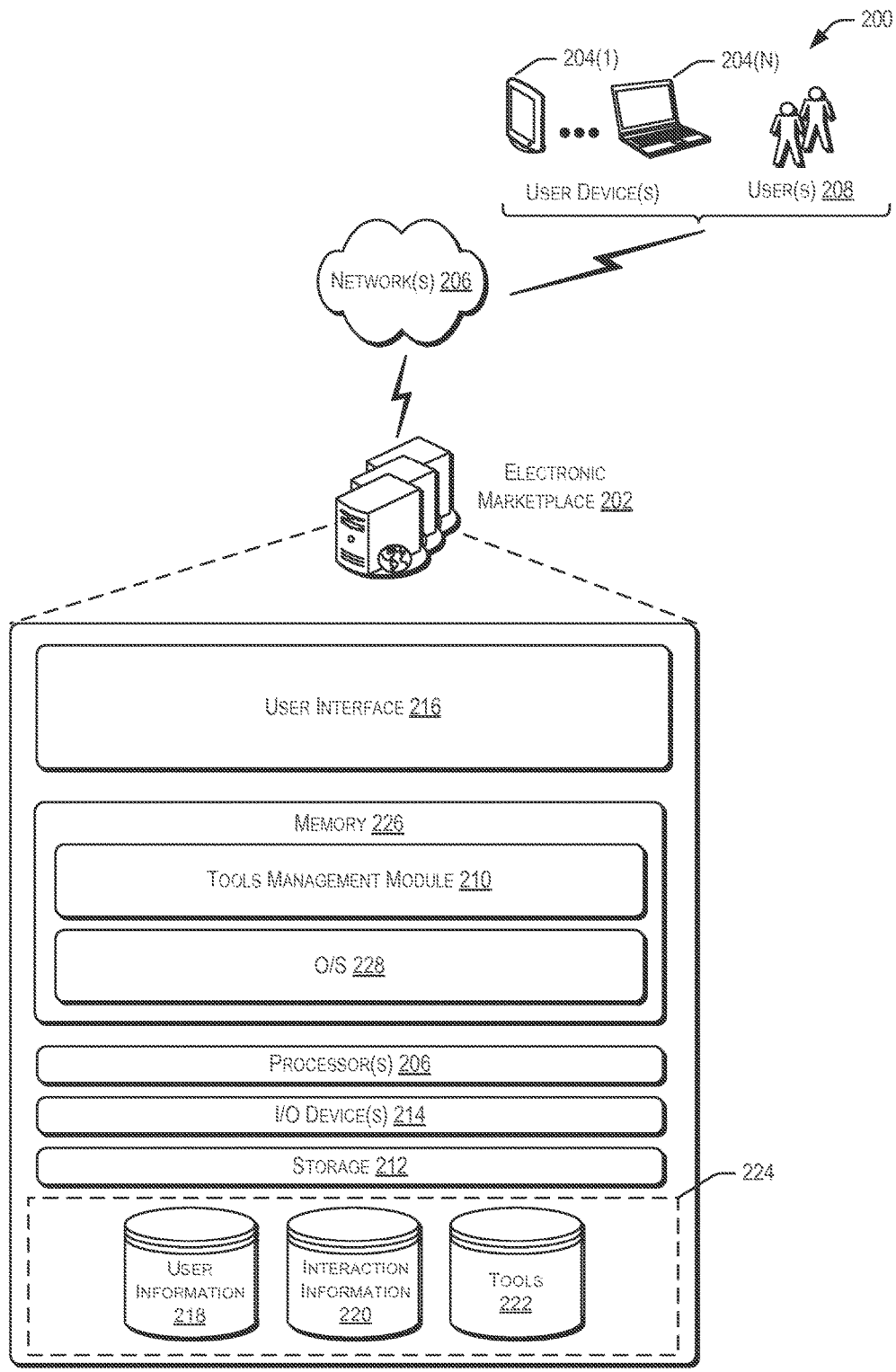
FIG. 2 illustrates an example architecture and device for implementing tool selection techniques as described herein, according to at least one example.

Turning next to FIG. 2, an example architecture 200 for implementing tool selection techniques as described herein is shown, according to at least one example. The architecture 200 includes electronic marketplace 202. The electronic marketplace 202 is an example of the electronic marketplace discussed with reference to FIG. 1. The electronic marketplace 202 may be in communication with user devices 204(1)-204(N) (the user devices 204) via one or more network(s) 206 (the network 206). The network 206 may include any one or a combination of many different types of networks, such as cable networks, the Internet, wireless networks, cellular networks, and other private and/or public networks. The user devices 204 may be operable by one or more users 208 to access the electronic marketplace 202 via the network 206. In some examples, the user 208 may be an example of the new user 112, the historical users 106, or any suitable other user, customer, seller, retailer, or the like associated with the electronic marketplace 202.

The user device 204 may be any suitable device cable of communicating with the networks 206. In some examples, the user device 204 may also be any suitable type of computing device such as, but not limited to, a mobile phone, a smart phone, a personal digital assistant (PDA), a laptop computer, a thin-client device, a tablet PC, a desktop computer, etc. In some examples, the user device 204 may be in communication with the electronic marketplace 202 via the networks 206, or via other network connections. In particular, the user device 204 may be utilized by the user 208 to communicate with the electronic marketplace 202.

The user device 204 may include a web service application that may allow the user 208 to interact with the electronic marketplace 202, such as to store, access, and/or manage data, develop and/or deploy computer applications, and/or host web content. The electronic marketplace 202 may include one or more service provider computers, perhaps arranged in a cluster of servers or as a server farm, and may host web service applications of the user device 204. These servers may be configured to host a website (or combination of websites) viewable via the user device 204 or a web browser accessible by the user 208 on the user device 204.

In accordance with at least one embodiment, the electronic marketplace 202 may include at least one memory 226 and one or more processing units (or processor(s)) 206. The processor(s) 206 may be implemented as appropriate in hardware, computer-executable instructions, firmware, or combinations thereof. Computer-executable instruction or firmware implementations of the processor(s) 206 may include computer-executable or machine-executable instructions written in any suitable programming language to perform the various functions described.

The memory 226 may include more than one memory and may be distributed throughout many different computer devices. For example, the memory 226, including its contents (e.g., tools management module 210), may be distributed throughout a cloud-computing configuration. In a cloud-computing configuration, stored on a single computer devices, or otherwise, the memory 226 may store program instructions that are loadable and executable on the processor(s) 206, as well as data generated during the execution of these programs. Depending on the configuration and type of service provider computers including the electronic marketplace 202, the memory 226 may be volatile (such as random access memory (RAM)) and/or non-volatile (such as read-only memory (ROM), flash memory, etc.). The electronic marketplace 202 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 226 may include multiple different types of memory, such as static random access memory (SRAM), dynamic random access memory (DRAM), or ROM. Turning to the contents of the memory 226 in more detail, the memory 226 may include an operating system 228 and one or more application programs, modules or services for implementing the features disclosed herein including at least the tools management module 210.

In accordance with at least one embodiment, the electronic marketplace 202 may also include additional storage 212, which may include removable storage and/or non-removable storage. The additional storage 212 may include, but is not limited to, magnetic storage, optical disks, and/or tape storage. The disk drives and their associated computer-readable media may provide non-volatile storage of computer-readable instructions, data structures, program modules, and other data for the computing devices.

The memory 226 and the additional storage 212, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the electronic marketplace 202. The electronic marketplace 202 may also include input/output (1/O) device(s) and/or ports 214, such as for enabling connection with a keyboard, a mouse, a pen, a voice input device, a touch input device, a display, speakers, a printer, etc.

In accordance with at least one embodiment, the electronic marketplace 202 may include a user interface 216. The user interface 216 may be utilized by the user 208 to access portions of the electronic marketplace 202. In some examples, the user interface 216 may include a graphical user interface, web-based applications, programmatic interfaces such as application programming interfaces (APIs), and the like. In some examples, the user 208 may access the electronic marketplace 202 via the user interface 216 to manage its items that are for sale in connection with the electronic marketplace 202.

In accordance with at least one embodiment, the user 208 may utilize the user interface 216 and a device similar to the user device 204 to perform searches for particular products for sale on the electronic marketplace 202, manage its inventory that is for sale in connection with the electronic marketplace, fulfill orders initiated by customers, communicate with other users, run one or more reports, utilize one or more tools related to the sale of its goods, and the like. In addition, the user 208 may create and/or manage a user profile including the user's 208 unique personal information. This user profile information may be stored by the electronic marketplace 202 in a user information database 218 of data store 224. Other information related to the user's 208 use of the electronic marketplace 202 (e.g., tool-utilization information, commerce information, and the like) may be stored in an interaction information database 220 of the data store 224.

Turning to the data store 224 in more detail, the electronic marketplace 202 may include the data store 224. The data store 224 includes one or more databases for storing data particular to the operations of the electronic marketplace 202. In some examples, the data store 224 may include the user information database 218, an interaction information database 220, and a tools database 222. In accordance with at least one embodiment, the data store 224 may include more or less databases than illustrated in FIG. 2. The data store 224 may be accessible by different components of the electronic marketplace 202 under different conditions. For example, the user 208 may access the user information database 218 via the user interface 216 to read, update, and manage user profile information of the user 208. Thus, the user information database 218 may include user profile information. Examples of user profile information that may be stored in the user information database 218 include: demographic information, services associated with the electronic marketplace 202 in which the user 208 participates, purchasing history, selling history, entity registration status if the user 208 is a business entity, physical location of goods for sale, contact information, and the like.

The interaction information database 220 may store interaction information as described herein. In some examples, the modules operating in connection with the electronic marketplace 202 may log the interaction information, or in some cases, the modules may be granted access to the information. In either case, the interaction information database 220 may store information relating to which tools the user 208 uses under which circumstances (e.g., tool-utilization information). The interaction information database 220 may also include information relating to the commercial aspects of the user's 208 activities on in connection with the electronic marketplace 202 (e.g., commerce information). Examples of commerce information that may be stored in interaction information database 220 includes: type of inventory (e.g., books, electronics, clothing, etc.), number of units sold over a period of time, number of units currently in inventory, number of orders processed, average rates (e.g., selling rate, inventory replenishment rate, order rate, shipment rate, etc.), inbound shipments for users utilizing fulfillment services, value of inventory (e.g., average for a period of time, static average, etc.), hazmat requirements, special handling instructions, and the like. In some examples, the interaction information stored in the interaction information database 220 may include more or less information than previously described.

Turning next to the tools database 222, the tools database 222 stores all of the tools available for the user 208 to utilize in connection with the electronic marketplace 202. In accordance with at least one embodiment, the tools available to the user 208 provide access to all tools available on the electronic marketplace 202. In some examples, the number of tools available to the user 208 means those tools that are particularly provided to the user 208 with respect to a user category, user type, services, or the like. Examples of tools stored in the tools database 22 include: inventory management tools (e.g., user-interface tools (e.g., inventory upload, online revenue calculator, etc.)), business analytics tools (e.g., sales reports, service fulfilled shipments, all orders, customer shipment sales, promotions, sales tax report, etc.), inventory reporting tools (e.g., inventory reconciliation report, service fulfilled report, daily inventory, monthly inventory, received inventory, inventory event detail, inventory adjustments, inventory health, cross-border inventory movement, inbound performance, hazmat status change, payments reports (e.g., long-term storage charges, reimbursements, free preview report)), customer concessions reporting tools (e.g., returns, replacements, etc.), removal reporting tools (e.g., recommended removals, removal order detail, removal shipment detail), and the like. The tools database 222 may also store configurations of tools, whether those configurations are user-created or system-created. In some examples, the tools stored in the tools database 222 may include more or less tools than previously described.

Figure 3:
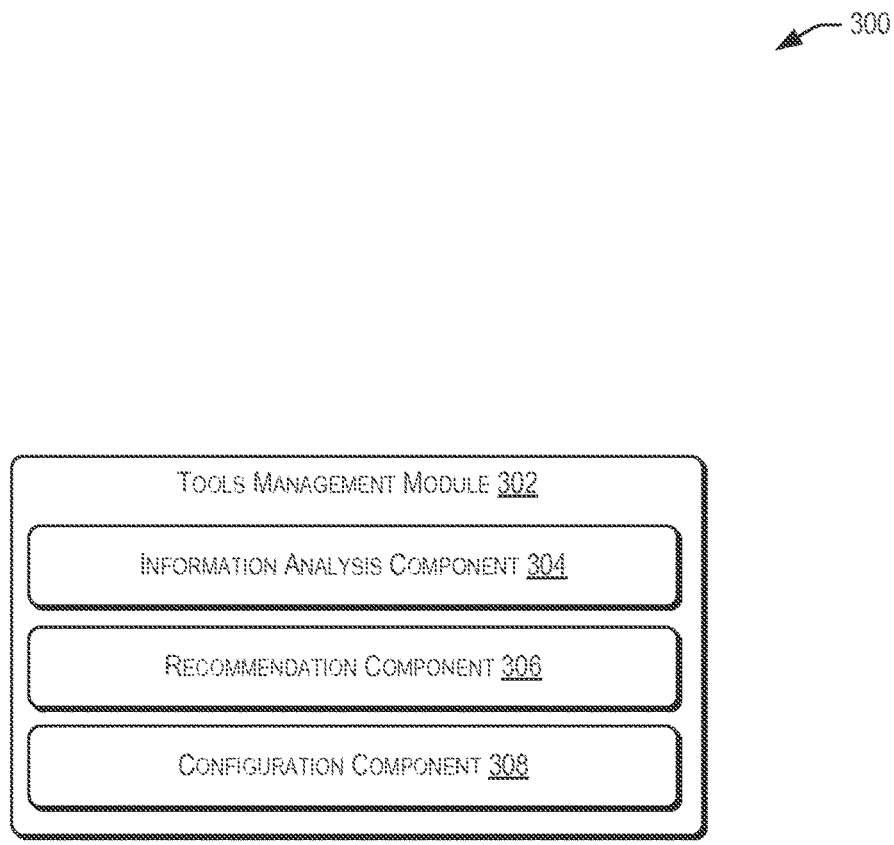
FIG. 3 illustrates an example device for implementing tool selection techniques as described herein, according to at least one example.

Turning to the details of the tools management module 210, stored in the memory 226 of the electronic marketplace 202. The tools management module 210 may be configured to manage one or more sub-modules, components, and/or services directed to embodiments disclosed herein. As illustrated in FIG. 3, a tools management module 302 is provided. The tools management module 302 is an example of the tools management module 210 stored in the memory 226 of the electronic marketplace 202. In accordance with at least one embodiment, the tools management module 302 may include an information analysis component 304, a recommendation component 306 and a configuration component 308. While these modules and components are illustrated in FIG. 3 and will be described as performing discrete tasks, it is understood that FIG. 3 illustrates example configurations and other configurations performing other tasks and/or similar tasks as those described below may be implemented according to the techniques described herein. Other modules (not shown) may perform the same tasks as the tools management module 302 or other tasks and may be implemented in a similar fashion or according to other configurations.

Generally, the tools management module 302 may be configured to implement the techniques relating to tools selection described herein. The information analysis component 304 of the tools management module 302 may be configured to analyze data sets including information accessible in one or more of the databases within the data store 224. For example, the information analysis component 304 may access data within the interaction information database 220 in order to learn from the data. This data may include interaction information. In accordance with at least one embodiment, the information analysis component 304 may implement any suitable machine learning techniques to analyze the interaction information to identify patterns relating to the use of tools by users with particular characteristics. In some examples, the interaction information may be a training set of data for use with respect to any suitable machine learning technique.

Thus, in some examples, the information analysis component 304 may analysis tool-utilization information, profile information, and commerce information. With respect to tool-utilization information, the information analysis component 304 may assign available tools to available categories, and then assign users to each respective category, or visa-versa. The determination of tool categories may depend on one or more pre-determined categories. For example, pre-defined categories may include categories that existed before the information analysis component 304 began analyzing the data and may depend on tool type, tool purpose, how tool is used (within a user interface, via export, etc.), and the like. In accordance with at least one embodiment, tool categories may be determined by the information analysis component 304 for the purpose of categorizing the tools.

Regardless of the category type, a recommendation component 306 of the tools management module 302 may access the interaction information analyzed by the information analysis component 304 to make predictions, recommendations, or the like. In accordance with at least one embodiment, the recommendation component 306 may correlate new users with users previously assigned to categories by the information analysis component 304. In other words, the recommendation component 306 may compare a new user to the users previously assigned to the categories, determine which category of users is most similar to the new user and, based on that determination, recommend the set of tools associated with the category to the new user.

In some examples, instead of assigning tools to categories, the information analysis component 304 may analyze the interaction information and provide it to the recommendation component 306 to make a relevance prediction independently for each tool. To do so, the recommendation component 306 may take into account the interaction information and information about the new seller. In some examples, the relevance predication may be binary and/or correlated to a threshold. In accordance with at least one embodiment, the relevance prediction may include a list of tools ranked by relevance to the new user. The list of ranked tools and/or tools within categories may include all tools available with respect to the electronic marketplace, only those whose relevancy correlated to one or more thresholds, similar tools configured in different ways, a subset of all tools available, tools available to the user as part of a service, and/or any suitable other combination of tools. In some examples, the recommendation component 306 may dynamically recommend tools.

A configuration component 308 is also included as part of the tools management module 302. In accordance with at least one embodiment, the configuration component 308 may be utilized by users, such as users 208, to configure their respective tools. These configurations of the tools may be specific to the user and/or be system-wide configurations. In some examples, the configuration component 308 may be configured to save the tool configurations in connection with the tools database 222. In addition to configuring tools, the configuration component 308 may enable the users 208, or other users, to configure tools shown on a user interface. For example, the recommendation component 306 may determine that a new user would be interested in using tools X, Y, and Z in connection with an electronic marketplace. Thus, these tools may be presented to the new user on a user interface associated with the electronic marketplace. After a time, the user may decide that it no longer has a need for tool Z. Utilizing techniques described herein, the user may notify the configuration component 308 to remove tool Z from the user interface.

Figure 4:
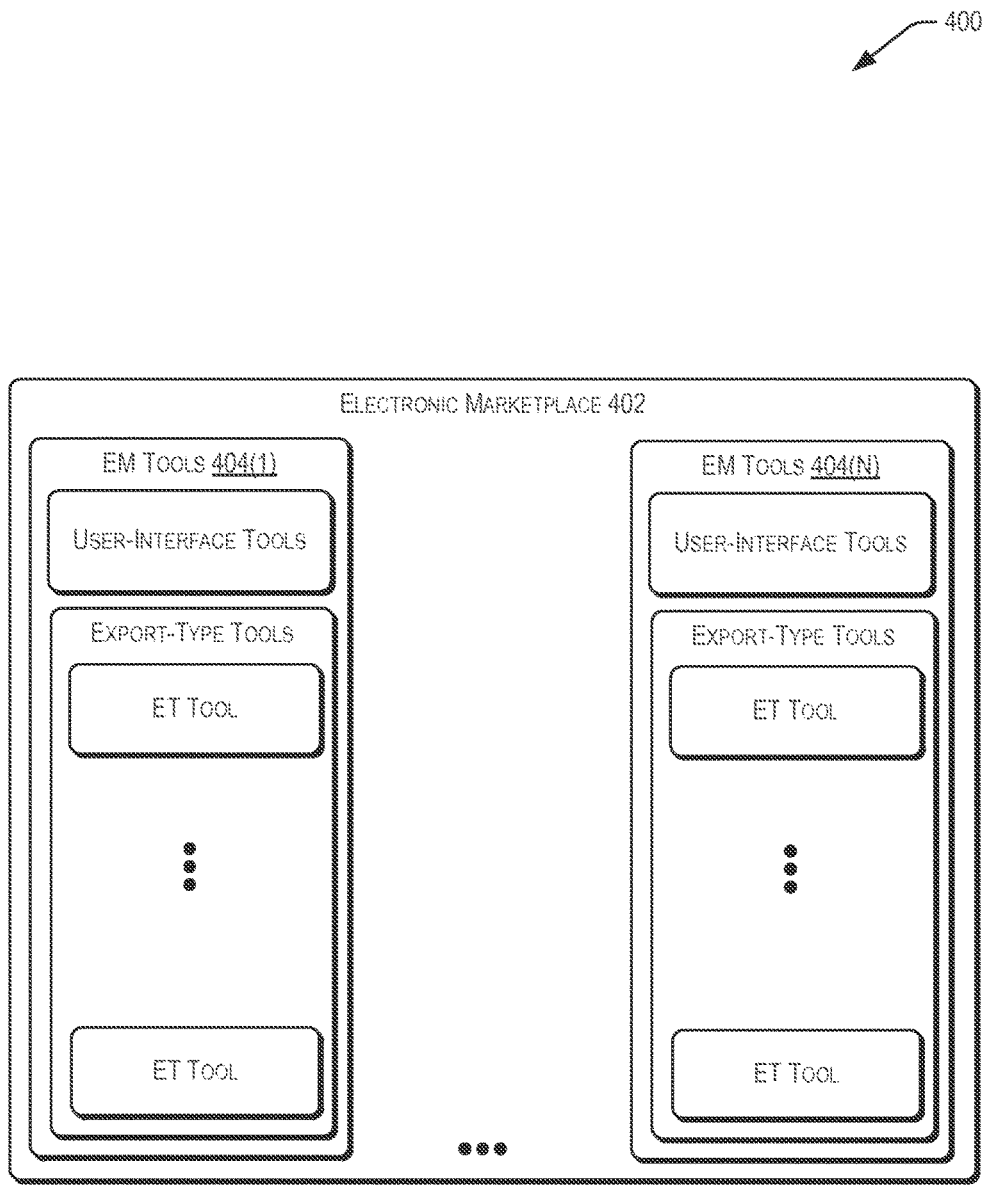
FIG. 4 illustrates an example of types of tools that may be selected according to tool selection techniques described herein, according to at least one example.

Turning to the next figure, FIG. 4 illustrates example tool collection 400. The tool collection 400 includes examples of the types of tools that may be available in connection with electronic marketplace 402. The electronic marketplace 402 is an example of the electronic marketplace 202 described with respect to FIG. 2. The electronic marketplace 402 may include, among many other things, electronic marketplace tools 404(1)-404(N) (the EM tools 404). The EM tools 404 may include all tools available to all users associated with the electronic marketplace. In some examples, the EM tools 404(1) may be available to certain seller types as part of a subscription or service agreement and the EM tools 404(N) may be available to other seller types. Thus, different EM tools 404 may be available to different sellers based on seller type, seller category, and/or a services category to which the particular seller belongs. In accordance with at least one embodiment, the EM tools 404 may include user-interface tools and report tools. In some examples, the EM tools 404 may include more or less tools than illustrated in FIG. 4. The user-interface tools may be configured to enable a user of the electronic marketplace to perform one or more operations in connection with items sold on the electronic marketplace. For example, the user-interface tools may include tools to assist users in uploading inventory to the electronic marketplace and may include one or more configurable aspects of those tools. The EM tools 404 may also include report tools. Many different types of report tools and user-interface tools may be made available with respect to the electronic marketplace 402.

Figure 5:
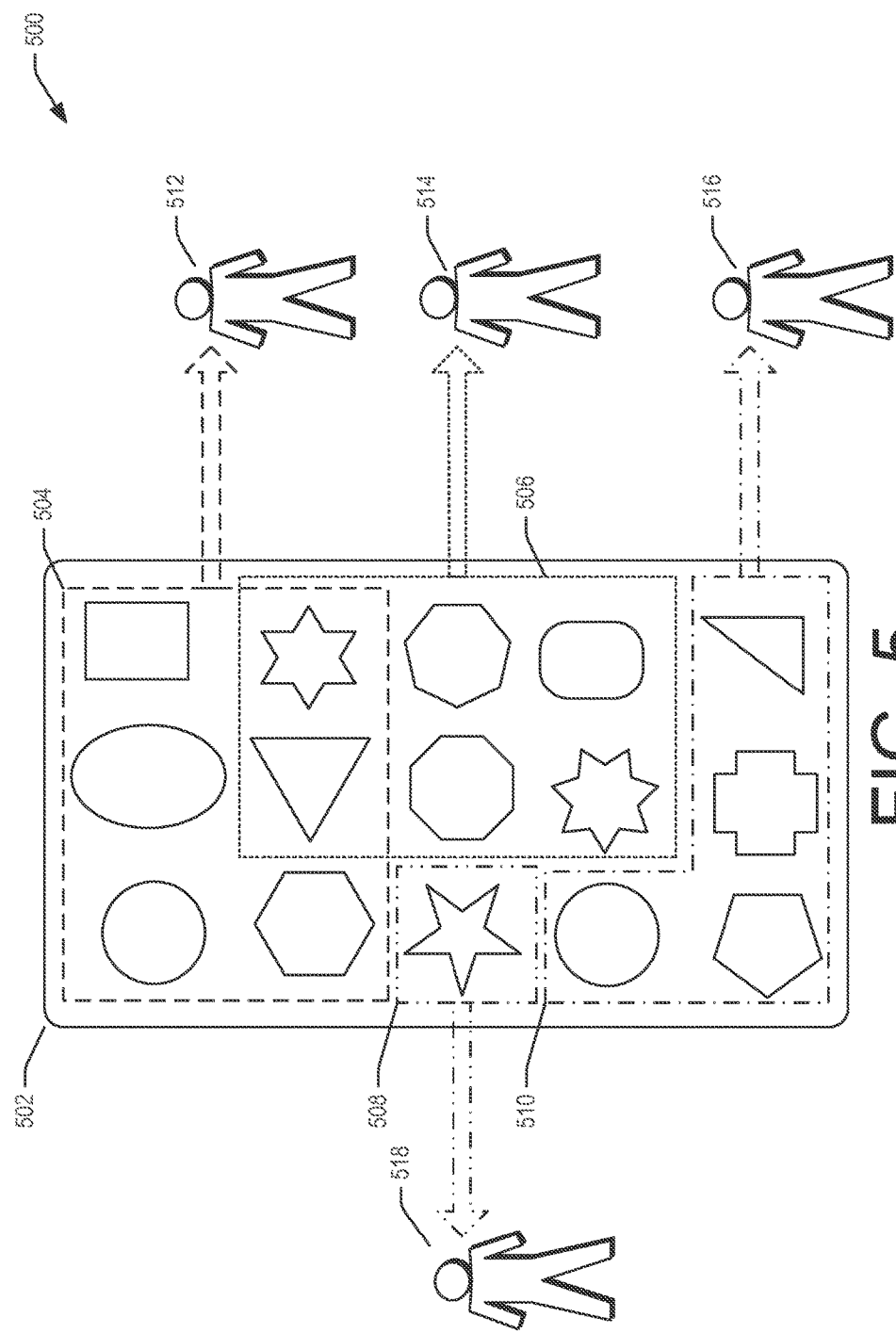
FIG. 5 illustrates an example representation of tools organized by category according to tool selection techniques described herein, according to at least one example.

FIG. 5 illustrates an example tool arrangement 500 wherein tools are shown organized by category and different sellers are assigned to each category. The tool arrangement 500 includes tool repository 502. The tool repository 502 is an example of the tool repository 102 discussed with respect to FIG. 1. The tools, or sets of tools, of the tool repository 502 may be organized according to one or more categories (504-510). In some examples, the categories 504-510 are mutually exclusive; in some examples, they are not. For example, the triangle and six-pointed star are located in the category 504 and the category 506. Using techniques described herein, users 512-518 may be assigned to one or more of the categories 504-510. This assignment may be based on a prediction of whether the tools in the particular category would be relevant to the user. Although one user is shown per category in FIG. 5, it is understood that more than one user may be assigned any suitable category of tools. In some examples, a category may only include a set of one tool, such as the category 508. In accordance with at least one embodiment, the category 508 may be populated as an independent prediction of relevance of the five-pointed star to the user 518.

Figure 6:
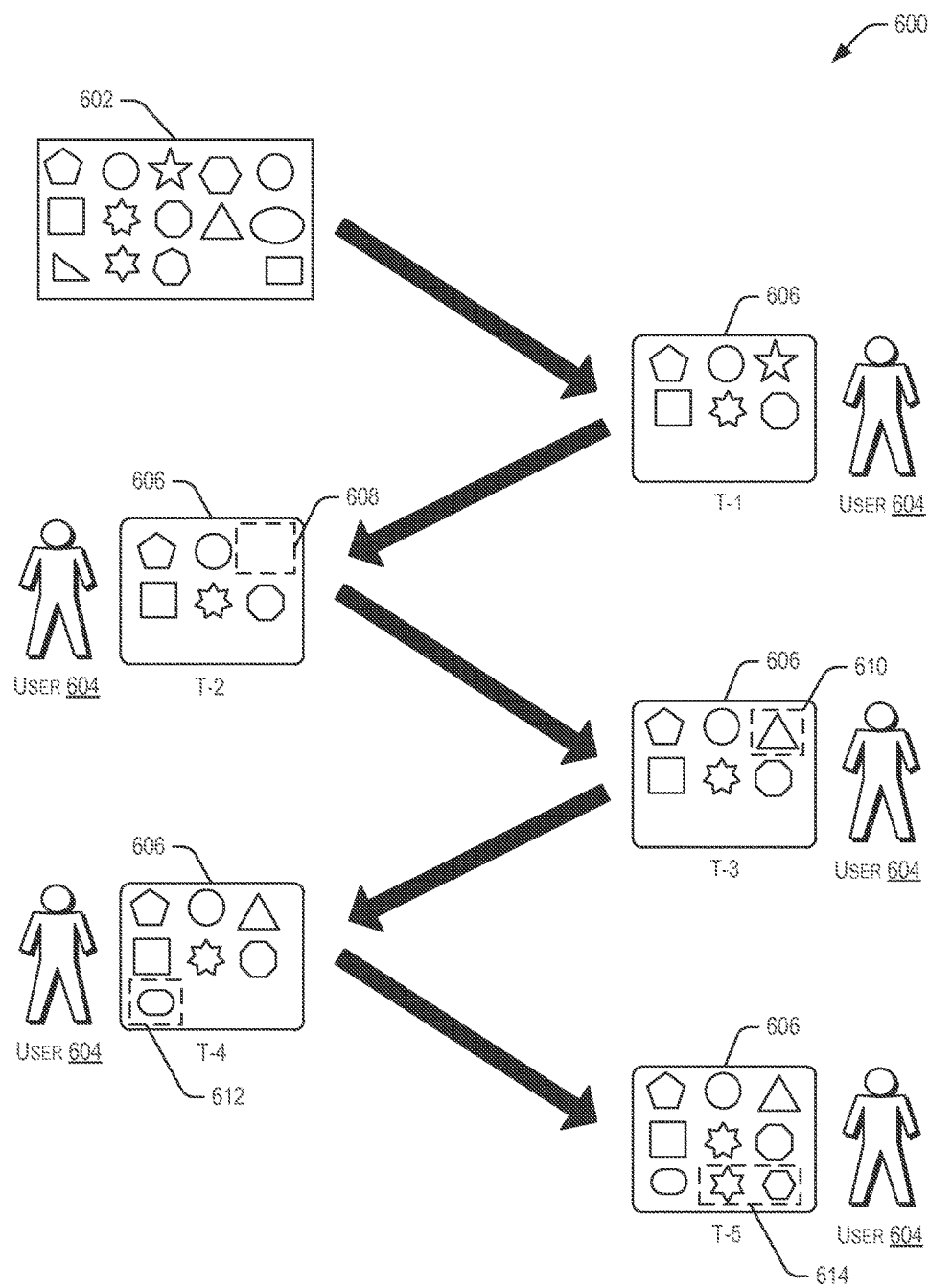
FIG. 6 illustrates an example flow diagram depicting changes to tools of a user according to tool selection techniques described herein, according to at least one example.

FIG. 6 illustrates an example flow 600 which represents changes to a user toolbox 606 over time. The user toolbox 606 is associated with a user 604. At time T-1, the user 604 has signed up for a service provided by an electronic marketplace to sell its goods in connection with the electronic marketplace. According to techniques described herein, tools included in the user toolbox 606 were selected from tool repository 602. The tool repository 602 is an example of the tool repository 102 described with reference to FIG. 1. The user toolbox 606 at time T-1 includes six shapes representing six tools. At time T-2, the user 604 performs one or more actions resulting in the removal of star tool 608 from the user toolbox 606. The star tool 608, now removed, may have been removed by the user 604 because the user 604 did not have use for the star tool 608 or for any other suitable reason. Thus, the star tool 608 may have been removed in response to one or more implicit acts taken by the user (e.g., nonuse). Information describing the user's 604 removal of the star tool 608 may be logged and used in making tools predictions to other users. At time T-3, the user 604 performs one or more actions resulting in the addition of triangle tool 610. The triangle tool 610 may have been added by the user 604 because the triangle tool 610 was helpful to the user 604 in managing the sales of its items on the electronic marketplace. In accordance with at least one embodiment, the triangle tool 610 may have been made available to the user 604 previously, or could have been included as part of a secondary tool set. At time T-4, the system adds system tool 612 to the user toolbox 606. In some examples, the system tool 612 is an entirely new tool for which the system has no interaction information data. Thus, in accordance with at least one embodiment, the system may provide the system tool 612 to all users in connection with the electronic marketplace, including the user 604. In some examples, the systems described herein may determine a particular category, group, or set of users to provide the system tool 612 to. In this manner, the system tool 612 may only be provided to those users which would find the system tool 612 relevant to their operations.

Continuing with FIG. 6, at time T-5, other tools 614 are added to the user toolbox 606. In accordance with at least one embodiment, the other tools 614 may have been available at time T-1, but may have been determined to be irrelevant to the user 604. However, as time has gone on, in some examples, the systems associated with the electronic marketplace may reevaluate the relevance of tools to the user 604. In accordance with at least one embodiment, the reevaluation may take place as a result of a request by the user 604. In this manner, the recommendation of tools to a particular user may be ongoing. In some examples, the reevaluation may take place periodically, when certain events take place (e.g., changes in service, changes in commerce information, changes in profile information, etc.), and the like.

Figure 7:
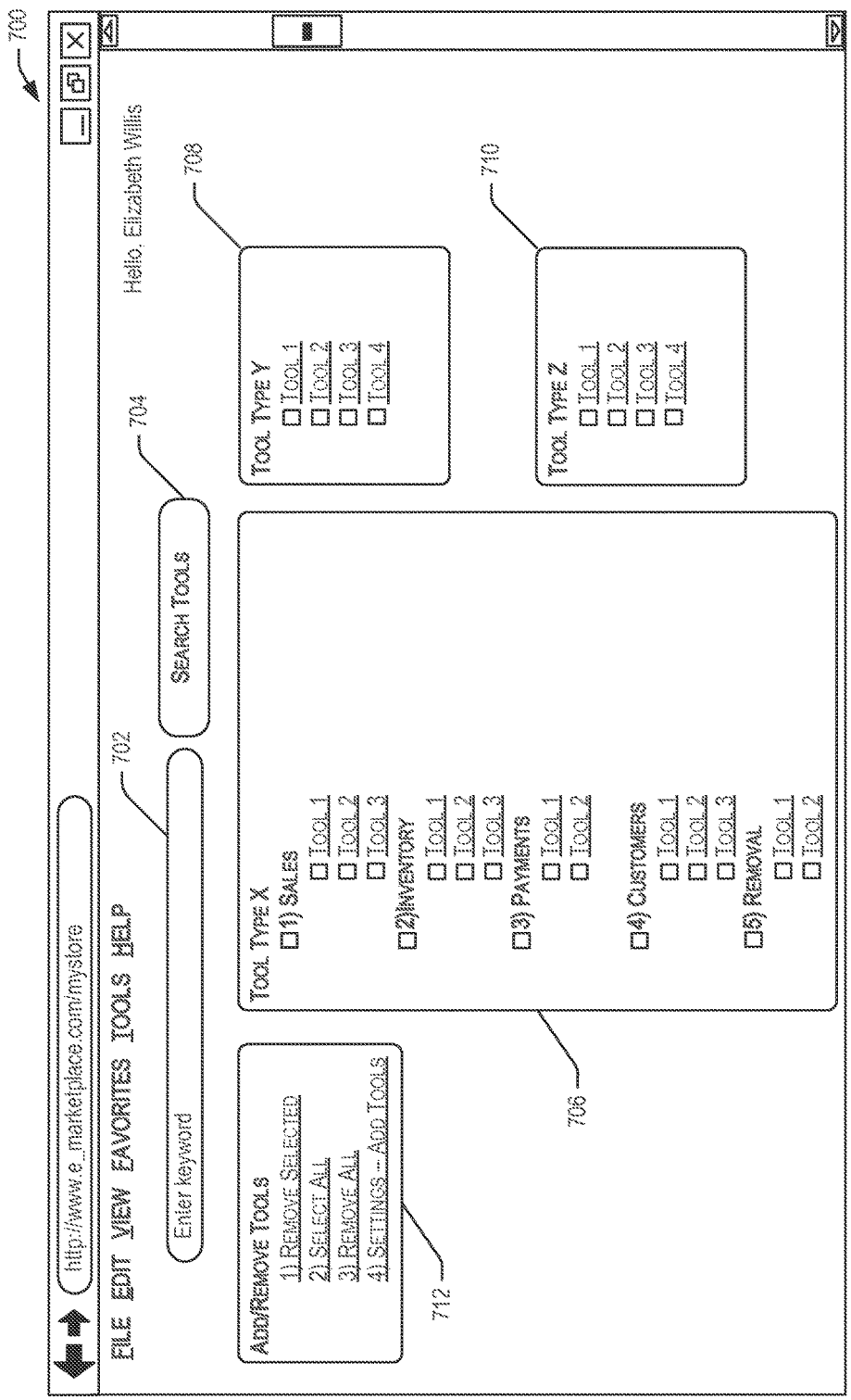
FIG. 7 illustrates an example user interface for managing tools according to tool selection techniques described herein, according to at least one example.

Turning now to FIG. 7, this figure illustrates an example user interface 700 for managing tools according to techniques described herein. In accordance with at least one embodiment, the user interface 700 may include a search bar 702 and a search button 704. The search bar 702 and the search button 704 may be utilized by a user of the user interface to search for available tools. The user interface 700 may also include tool type X box 706, tool type Y box 708, and tool type Z box 710. Each box may include different tools available for use by the user. In some examples, the user may be enabled to configure the tools into the different boxes. In accordance with at least one embodiment, the tool type X box 706 may include one or more subgroups or subsets of tools organized by category (e.g., sales, inventory, payments, customers, removal, etc.). Within each of the tool type boxes (706-710) are "Tools." Each "Tool" is underlined to show a hyperlink. When a user clicks a hyperlink the system may execute the tool, open another page to execute the tool, or open the tool directly. Depending on the type of tool, the result of clicking on a hyperlink may be different. To the left side of each "Tool" of the tool type boxes 706-710, and each subcategory of tools for the tool type X box 706, is a selection box. The selection boxes may be toggled by an action of the user from a selected state to an unselected state. The selection boxes are all shown in an unselected state. The add/remove tool box 712 may be used to add and remove tools from the one or more tool type boxes. In some examples, when the user selects "remove selected" from the add/remove tool box 712, those tools or subcategories of tools that have a selection box in a selected state will be removed from the user interface 700. In some examples, use of "select all" will change all selection boxes to a selected state. In accordance with at least one embodiment, when the user clicks the "settings-add tools" link, a new page may be presented to the user that includes all available tools. The tools on the settings page may be characterized as hidden tools, tools invisible to the user, secondary tools, and the like. The tools in the tool type boxes may be characterized as primary tools, tools visible to the user, unhidden tools, and the like.

Figure 8:
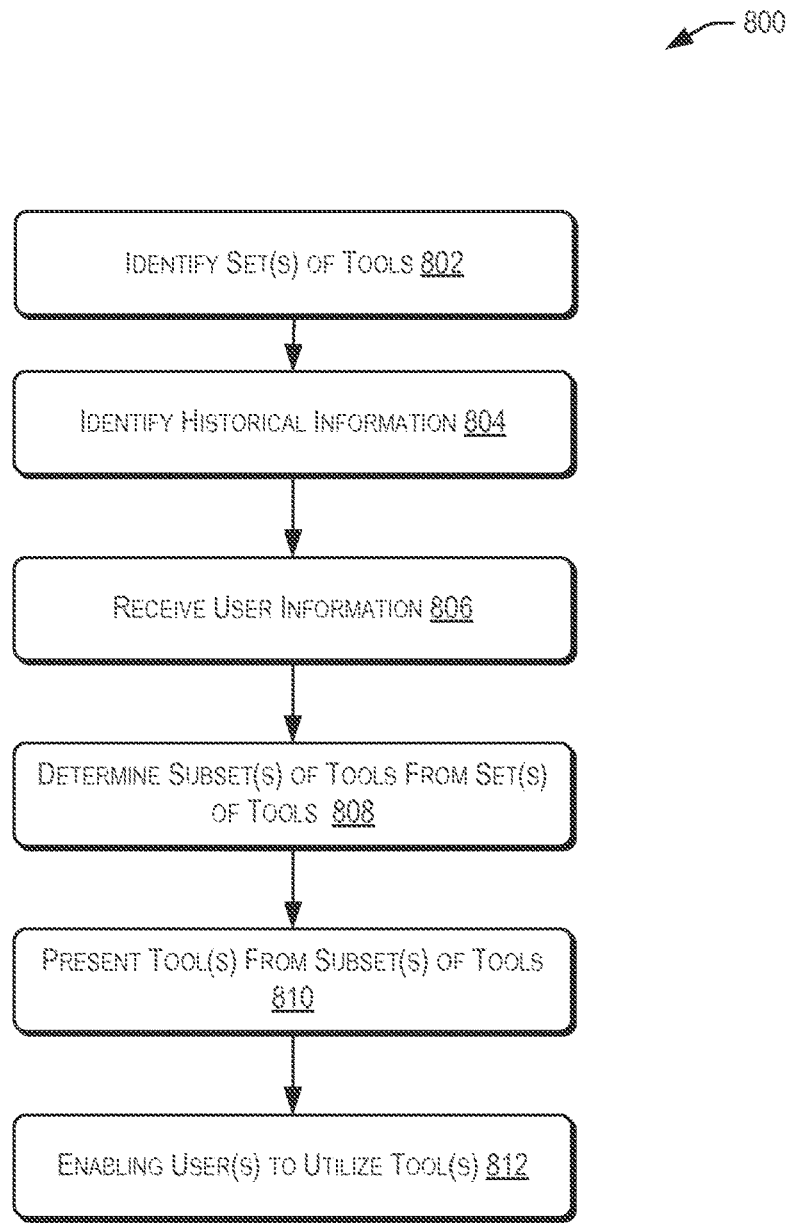
FIG. 8 illustrates an example flow diagram depicting example steps for implementing tool selection techniques as described herein, according to at least one example.

FIG. 8 depicts an illustrative flow diagram showing process 800 for recommending tools to a user according to at least one example. The tools management module 210 (FIG. 2) of the electronic marketplace 202 (FIG. 2) may perform the process 800 of FIG. 8. The process 800 begins at step 802 by identifying sets of tools. In accordance with at least one embodiment, identifying sets of tools may be performed by the information analysis component 304 (FIG. 3). In some examples, identifying sets of tools may include receiving sets of tools from the electronic marketplace 202, searching for sets of tools in a tools database associated with the electronic marketplace 202, or the like. At step 804, the process 800 identifies historical information. In accordance with at least one embodiment, the information analysis component 304 may identify the historical information from one or more databases associated with the electronic marketplace 202. In some examples, the historical information is associated with one or more historical users (prior or current) of the electronic marketplace 202. In accordance with at least one embodiment, the historical information may characterize interactions of item providers or sellers of goods in connection with the electronic marketplace 202. Identifying historical information may also include, in some examples, receiving commerce information, profile information, or tool-utilization information for a user, set of users, category of users, or the like. At step 806, the process 800 receives user information. In accordance with at least one embodiment, the information analysis component 304 may receive user information from one or more users for which relevance of tools may be determined. In some examples, the user information may characterize a profile of a user for which relevant tools may be predicted. Because the user may be a new user, the user information may include part or all of the information known for the user. At step 808, the process 800 determines subsets of tools from the sets of tools. In accordance with at least one embodiment, the recommendation component 306 (FIG. 3) of the tools management module 302 may determine subsets of tools from the sets of tools. In some examples, determining subsets of tools from sets of tools may include considering historical information identified at step 804 and user information received at step 806. In some examples, determining subsets of tools may include predicting subsets of tools relevant to the user, suitable to the user, and the like. At step 810, the process 800 presents tools from the subsets of tools. In accordance with at least one embodiment, the recommendation component 306 may present tools. In some examples, presenting tools may include presenting tools with respect to a user interface, notifying a user via email, serving a webpage including a reference to the tools, and the like. In some examples, presenting may include generally making available to the user. At step 812, the process 800 enables users to utilize tools. In accordance with at least one embodiment, the configuration component 308 (FIG. 3) may enable users to utilize tools. In some examples, enabling users to utilize tools may include allowing users to use tools to perform one or more actions in connection with items provided on the electronic marketplace 202. In some examples, enabling users may include granting permission to users.

Figure 9:
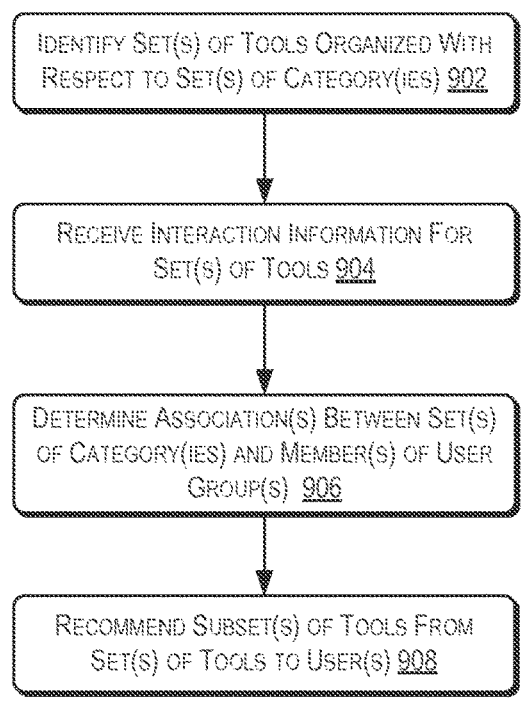
FIG. 9 illustrates an example flow diagram depicting example steps for implementing tool selection techniques as described herein, according to at least one example.

FIG. 9 depicts an illustrative flow diagram showing process 900 for recommending tools to a user according to at least one example. The tools management module 210 (FIG. 2) of the electronic marketplace 202 (FIG. 2) may perform the process 900 of FIG. 9. The process 900 begins at step 902 by identifying sets of tools organized with respect to sets of categories. In accordance with at least one embodiment, the information analysis component 304 (FIG. 3) may identify sets of tools. In some examples, identifying sets of tools may include identifying categories and identifying tools. In some examples, identifying sets of tools may include receiving information describing the tools and the categories. At step 904, the process 900 receives interaction information for sets of tools. In accordance with at least one embodiment, the information analysis component 304 may receive interaction information. In some examples, interaction information may include information characterizing interactions of one or more users with respect to the electronic marketplace 202. In some examples, the interaction information may also include information associated with behaviors and characteristics of the one or more users. At 906, the process 900 determines associations between sets of categories and members of user groups. In accordance with at least one embodiment, the recommendation component 306 may perform this step. In some examples, determining associations may include comparing tools in the categories with characteristics of members of the user groups. In at least one example, the categories may be pre-defined or established on-the-fly for purposes of implementing the techniques described herein. At step 908, the process 900 recommends subsets of tools from sets of tools to users. In accordance with at least one embodiment, the recommendation component 306 (FIG. 3) may recommend subsets of tools. In some examples, recommending subsets of tools may include predicting relevance of a subset of tools to a user based on information provided by the user and interaction information, presenting the subset of tools to the user, allowing the user to utilize the subset of tools, and the like.

Figure 10:
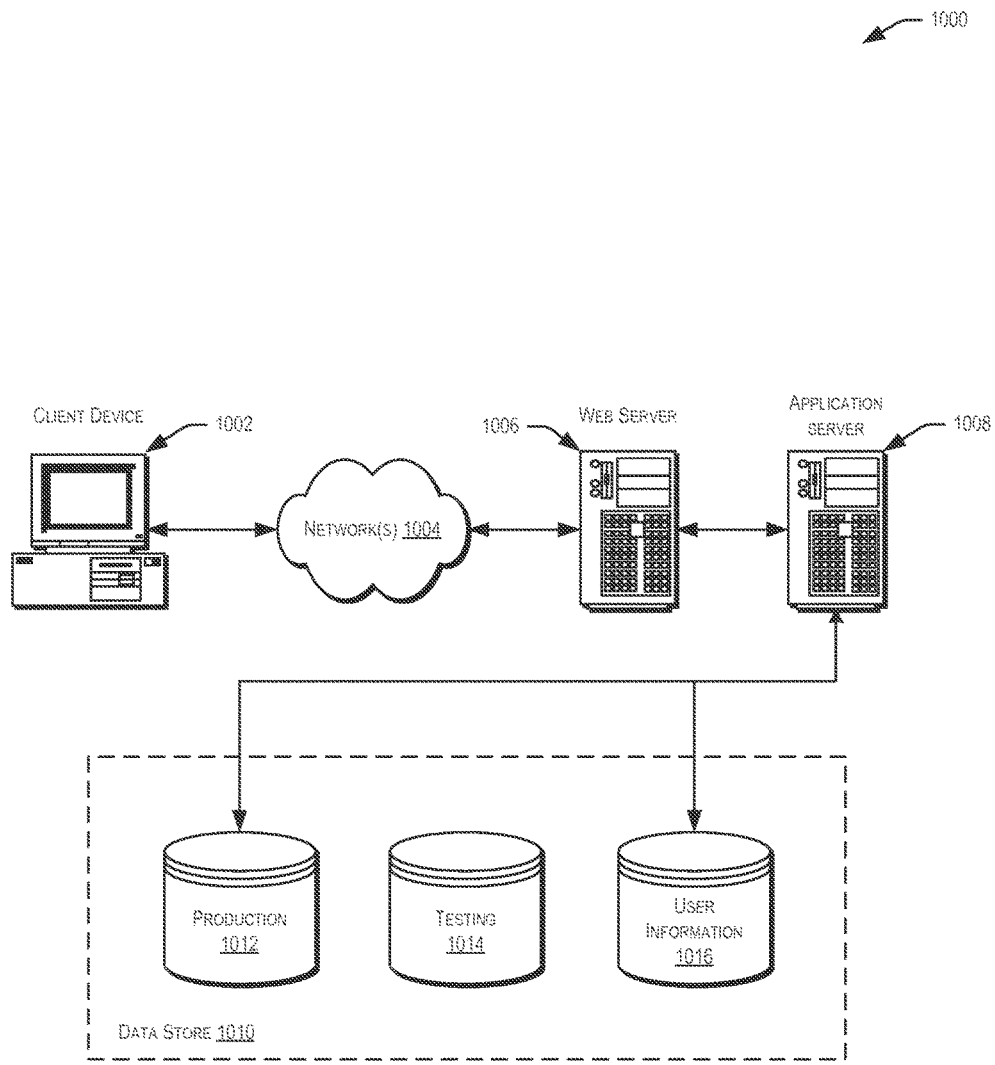
FIG. 10 illustrates an example architecture for implementing tool selection techniques as described herein, according to at least one example.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any suitable device operable to send and receive requests, messages or information over a suitable network 1004 and convey information back to a user of the device. Examples of such client devices include personal computers, cell phones, handheld messaging devices, laptop computers, set-top boxes, personal data assistants, electronic book readers and the like. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1108 and a data store 1010. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any suitable medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y. or Z, or any combination thereof (e.g., X, Y. and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   identifying, by a computer system, a plurality of functional tools configured to allow users to manage first items offered in an electronic marketplace, the plurality of functional tools organized with respect to a plurality of tool categories;
   receiving interaction information identifying historical user actions performed, by a user group during a first time period, with a particular set of functional tools from a first tool category of the plurality of tool categories, the user group comprising a class of users defined by a seller type;
   determining, by the computer system, an association between the first tool category and the class of users of the user group based at least in part on the interaction information;
   during a second time period occurring after the first time period and in response to a user request, performing a classification of a user into the user group based at least in part on user information associated with the user;
   modifying a user interface from a default state including a first set of functional tools to a modified state including a second set of functional tools, the modifying of the user interface from the default state to the modified state comprising adding or removing, based at least in part on the classification and independent of user input, at least one functional tool such that the first set of functional tools is different from the second set of functional tools; and
   providing the modified user interface in the modified state for presentation at a user device associated with the user, the at least one functional tool being launchable from the modified user interface to perform one or more actions with respect to management of second items of the user that are offered in the electronic marketplace.

2. The computer-implemented method of claim 1, wherein performing the classification of the user includes determining a similarity of the user to the class of users of the user group based at least in part on the association and the user information.

3. The computer-implemented method of claim 1, further comprising recommending a new functional tool of the plurality of functional tools to the user based at least in part on a different association between a tool category to which the new functional tool belongs and the class of users of the user group.

4. The computer-implemented method of claim 1, further comprising:
   ranking functional tools with respect to the particular set of functional tools based at least in part on a relevancy of the functional tools to the user; and
   recommending at least a portion of the ranked functional tools of the particular set of functional tools to the user.

5. The computer-implemented method of claim 1, wherein the electronic marketplace provides a service that enables the class of users to offer items in association with the electronic marketplace.

6. The computer-implemented method of claim 1, further comprising:
  determining a correlation between the user and at least one user of the class of users of the user group based at least in part on the user information, the user information identifying one or more characteristics of the user;
  predicting a relevance of the at least one functional tool to the user based at least in part on the determined correlation; and
  modifying the user interface from the default state to the modified state is further based at least in part on the relevance.

7. The computer-implemented method of claim 1, further comprising receiving from the user a request to remove or add a functional tool from the at least one functional tool included in the second set of functional tools.

8. The computer-implemented method of claim 1, further comprising monitoring behavior of the user with the at least one functional tool and removing a functional tool from the at least one functional tool when the behavior of the user indicates that the user is not utilizing the functional tool.

9. The computer-implemented method of claim 1, further comprising:
  receiving other user information that is indicative of characteristics of the class of users of the user group;
  determining subgroups of the user group based at least in part on the characteristics of the users of the user group;
  identifying a further subgroup of the subgroups to which the user belongs based at least in part on the user information identifying one or more characteristics of the user; and
  recommending the at least one functional tool to other users in the identified further subgroup based at least in part on the identification of the further subgroup.

10. The computer-implemented method of claim 1, wherein the interaction information comprises a training set of data, the training set of data configured to be used by the computing system to recommend functional tools from the plurality of functional tools to item providers which offer the first items with respect to the electronic marketplace, the user being an item provider.

11. The computer-implemented method of claim 1, wherein modifying the user interface from the default state to the modified state is further based at least in part on dynamically adjusting the at least one functional tool based at least in part on a machine learning technique.

12. One or more computer-readable storage devices for storing computer-executable instructions that, when executed by one or more computer systems, configure the one or more computer systems to perform operations, comprising:
  identifying a plurality of functional tools configured to allow users to manage first items offered in an electronic marketplace, the plurality of functional tools organized with respect to a plurality of tool categories;
  receiving interaction information identifying historical user actions performed, by a user group during a first time period, with a particular set of functional tools from a first tool category of the plurality of tool categories, the user group comprising a class of users defined by a seller type;
  determining an association between the first tool category and the class of users of the user group based at least in part on the interaction information;
  during a second time period occurring after the first time period and in response to a user request, performing a classification of a user into the user group based at least in part on user information associated with the user;
  modifying a user interface from a default state including a first set of functional tools to a modified state including a second set of functional tools, the modifying of the user interface from the default state to the modified state comprising adding or removing, based at least in part on the classification and independent of user input, at least one functional tool such that the first set of functional tools is different from the second set of functional tools; and
  providing the modified user interface in the modified state for presentation at a user device associated with the user, the at least one functional tool being launchable from the modified user interface to perform one or more actions with respect to management of second items of the user that are offered in the electronic marketplace.

13. The one or more computer-readable storage devices of claim 12, wherein the instructions further configure the one or more computer system to perform operations comprising:
  receiving other user information that is indicative of characteristics of the class of users of the user group;
  determining subsets of users from the user group based at least in part on the interaction information and the characteristics of the class of users of the user group;
  identifying a particular subset of users including the user; and
  presenting a new functional tool to other users of the identified particular subset of users including the user.

14. The one or more computer-readable storage devices of claim 12, wherein the interaction information further comprises commerce information that includes at least one of a type of inventory, an amount of inventory in stock, a value of inventory in stock, an outbound shipment rate, an inbound shipment rate, an order rate, or a special handling instructions.

15. The one or more computer-readable storage devices of claim 12, wherein the historical user actions comprise at least one of producing a financial report, producing an inventory report, or managing inventory.

16. The one or more computer-readable storage devices of claim 12, wherein determining the association between the first tool category and the class of users of the user group comprises determining relevance of the first tool category with respect to the class of users of the user group.

17. The one or more computer-readable storage devices of claim 12, wherein the instructions further configure the one or more computer system to perform operations comprising, at a time after providing the modified user interface:
  receiving, from the user, information indicating a selection of a first functional tool from the at least one functional tool; and
  enabling the user to utilize the first functional tool to perform at least one action of the one or more actions with respect to managing the second items offered in the electronic marketplace.

18. The one or more computer-readable storage devices of claim 17, wherein modifying the user interface from the default state to the modified state is further based at least in part on a predicted relevance of the first functional tool to the user, the predicted relevance based at least in part on the user information associated with the user.

19. The one or more computer-readable storage devices of claim 12, wherein the plurality of functional tools comprises at least one of a user-interface tool or a report tool.

20. The one or more computer-readable storage devices of claim 19, wherein the user-interface tool is configured to at least manage inventory of the user and the report tool is configured to create one or more reports relating to business analytics, the inventory offered with respect to the electronic marketplace, customer concessions, removal of inventory offered with respect to the electronic marketplace, or special handling instructions.

21. A system comprising:
memory that stores computer-executable instructions; and
a processor configured to access the memory and execute the computer-executable instructions to collectively at least:
identify a plurality of functional tools configured to allow users to manage first items offered in an electronic marketplace, the plurality of functional tools organized with respect to a plurality of tool categories;
receive interaction information identifying historical user actions performed, by a user group during a first time period, with a particular set of functional tools from a first tool category of the plurality of tool categories, the user group comprising a class of users defined by a seller type;
determine an association between the first tool category and the class of users of the user group based at least in part on the interaction information;
during a second time period occurring after the first time period an in response to a user request, perform a classification of a user into the user group based at least in part on user information associated with the user;
modifying a user interface from a default state including a first set of functional tools to a modified state including a second set of functional tools, the modifying of the user interface from the default state to the modified state comprising adding or removing, based at least in part on the classification and independent of user input, at least one functional tool such that the first set of functional tools is different from the second set of functional tools; and
providing the modified user interface in the modified state for presentation at a user device associated with the user, the at least one functional tool being launchable from the modified user interface to perform one or more actions with respect to management of second items of the user that are offered in the electronic marketplace.

22. The system of claim 21, wherein the plurality of functional tools comprises at least a pre-configured tool, a configuration of the pre-configured tool determined based at least in part on the interaction information.

* * * * *

UNITED STATES PATENT AND TRADEMARK OFFICE
CERTIFICATE OF CORRECTION

PATENT NO. : 10,115,148 B1
APPLICATION NO. : 14/168767
DATED : October 30, 2018
INVENTOR(S) : Anand Varadarajan and Gregory Scott Miller Page 1 of 1

It is certified that error appears in the above-identified patent and that said Letters Patent is hereby corrected as shown below:

In the Claims

Column 22, Line 2, Claim 21:
Delete: "time period an in response to a user request, perform"
Insert: --time period and in response to a user request, perform--

Signed and Sealed this
Twenty-third Day of July, 2019

Andrei Iancu
*Director of the United States Patent and Trademark Office*